(12) United States Patent
Groome (10) Patent No.: US 11,506,323 B2
(45) Date of Patent: Nov. 22, 2022

(54) VENTILATION SYSTEM FOR INSULATED PIPE

(71) Applicant: Donald Groome, LAC Sainte Anne County (CA)

(72) Inventor: Donald Groome, LAC Sainte Anne County (CA)

( * ) Notice: Subject to any disclaimer, the term of this patent is extended or adjusted under 35 U.S.C. 154(b) by 205 days.

(21) Appl. No.: 17/081,845

(22) Filed: Oct. 27, 2020

(65) Prior Publication Data

US 2021/0123555 A1   Apr. 29, 2021

Related U.S. Application Data

(60) Provisional application No. 62/926,710, filed on Oct. 28, 2019.

(51) Int. Cl.
*F16L 55/07* (2006.01)
*F16L 3/12* (2006.01)
*F16L 3/123* (2006.01)
*F16L 55/09* (2006.01)

(52) U.S. Cl.
CPC ............... *F16L 55/07* (2013.01); *F16L 3/123* (2013.01); *F16L 3/1211* (2013.01); *F16L 55/09* (2013.01)

(58) Field of Classification Search
CPC . F16L 55/07; F16L 55/09; F16L 59/06; F16L 59/075; F16L 58/00; F16L 58/1063; F16L 3/123; F16L 3/1211
See application file for complete search history.

(56) References Cited

U.S. PATENT DOCUMENTS

| 1,772,378 | A | * | 8/1930 | Witt | ........................ | F16L 58/00 |
| | | | | | | 156/195 |
| 1,991,455 | A | | 2/1935 | Gottwald | | |
| 2,613,166 | A | | 10/1952 | Gronemeyer | | |
| 3,080,892 | A | * | 3/1963 | Plummer | ................ | H02G 3/045 |
| | | | | | | 174/DIG. 11 |
| 3,126,918 | A | * | 3/1964 | Eaton | ...................... | F16L 59/13 |
| | | | | | | 29/455.1 |
| 3,146,005 | A | * | 8/1964 | Peyton | .................. | F16L 59/184 |
| | | | | | | 285/365 |
| 4,190,512 | A | * | 2/1980 | Wyatt | ..................... | C23F 13/02 |
| | | | | | | 204/196.24 |

(Continued)

FOREIGN PATENT DOCUMENTS

DE   1177432 B  *  9/1964
DE   7830248       8/1979

(Continued)

*Primary Examiner* — Eret C McNichols
(74) *Attorney, Agent, or Firm* — William J. Bundren (57) ABSTRACT

A ventilation system for insulated pipe or pipeline to prevent corrosion thereof is discussed. The ventilation system can include an outer skin wrapped around the insulated pipe or pipeline, the outer skin separated from the insulation pipe by stand-off supports to form an annular chamber within the system. The system has a vent screen along a bottom side of the outer skin and a gable running along the top side of the outer skin, the gable having a number of openings therethrough to allow air to flow in through the vent screen, through the annular chamber and out through the gable openings, drawing moisture from the insulation thereby preventing corrosion of the pipe or pipeline.

10 Claims, 11 Drawing Sheets

(56) References Cited

U.S. PATENT DOCUMENTS

| | | | | |
|---|---|---|---|---|
| 4,250,927 | A | * | 2/1981 | Newburg .................. F16L 7/00 24/546 |
| 4,700,751 | A | | 10/1987 | Fedrick |
| 5,845,791 | A | * | 12/1998 | Kawolics .................. A47F 7/14 211/49.1 |
| 5,901,756 | A | * | 5/1999 | Goodrich ................ F16L 3/233 248/205.2 |
| 5,996,643 | A | | 12/1999 | Stonitsch |
| 6,012,292 | A | * | 1/2000 | Gulati .................... F17C 13/004 62/50.7 |
| 6,102,076 | A | * | 8/2000 | Romero, Jr. .......... F01N 13/085 138/128 |
| 6,111,194 | A | * | 8/2000 | Kroulik ................ H02G 3/0481 138/128 |
| 6,635,322 | B1 | | 10/2003 | Korsgaard |
| 6,786,241 | B2 | * | 9/2004 | Bedner .................. F16L 59/07 138/121 |
| 7,119,279 | B2 | * | 10/2006 | Niehaus ............... H02G 3/0487 174/DIG. 11 |
| 8,367,182 | B2 | * | 2/2013 | Rodrigues ........... B60R 16/0215 174/135 |
| 8,875,744 | B2 | | 11/2014 | Taagepera et al. |
| 10,221,967 | B2 | * | 3/2019 | Kingston ................ E21B 17/015 |
| 10,627,019 | B1 | * | 4/2020 | Franklin ................. F16L 57/00 |
| 10,656,044 | B1 | * | 5/2020 | Kuo ....................... G01M 3/165 |
| 11,384,891 | B1 | * | 7/2022 | Stone ....................... F16L 57/06 |
| 2004/0074555 | A1 | * | 4/2004 | Bedner .................... F16L 59/07 138/112 |
| 2004/0126562 | A1 | * | 7/2004 | Manzo .................. F16L 59/021 428/313.5 |
| 2006/0237085 | A1 | * | 10/2006 | Hickman ............... F16L 59/022 138/155 |
| 2009/0042156 | A1 | | 2/2009 | Meckelnburg et al. |
| 2019/0049047 | A1 | * | 2/2019 | Cruson ................ F16L 3/1211 |
| 2021/0123555 | A1 | * | 4/2021 | Groome ................ F16L 58/00 |
| 2021/0172561 | A1 | * | 6/2021 | Brigham ............ F16L 58/1063 |
| 2021/0388937 | A1 | * | 12/2021 | Smout ....................... B32B 1/08 |
| 2022/0049731 | A1 | * | 2/2022 | You .......................... F16B 2/08 |
| 2022/0170572 | A1 | * | 6/2022 | Heib ......................... B60P 3/32 |

FOREIGN PATENT DOCUMENTS

| | | | | |
|---|---|---|---|---|
| EP | 132777 | B1 | 6/1988 | |
| FR | 1204546 | A * | 1/1960 | |
| FR | 3095491 | A1 * | 10/2020 | ............ F16L 39/005 |
| GB | 445576 | | 4/1936 | |
| GB | 989844 | A * | 4/1965 | |
| WO | 2006002792 | A1 | 1/2006 | |
| WO | WO-2014181906 | A1 * | 11/2014 | ............ F16L 59/024 |
| WO | WO-2016093716 | A1 * | 6/2016 | ............ F16L 59/029 |

* cited by examiner

VENTILATION SYSTEM FOR INSULATED PIPE

CROSS REFERENCE TO RELATED APPLICATIONS

This application claims priority of U.S. provisional patent application Ser. No. 62/926,710 filed Oct. 28, 2019, which is incorporated by reference into this application in its entirety.

TECHNICAL FIELD

The present disclosure is related to the field of systems to prevent corrosion of insulated pipe or pipelines, in particular, systems for ventilating insulated pipe or pipelines.

BACKGROUND

Corrosion of insulated pipe or pipeline is a problem. Over time, insulation surrounding the pipe or pipeline can become wet or saturated with water or moisture. Water in the wet insulation can migrate to the pipe or pipeline, typically made of steel or other ferrous alloys. The water can react with the pipe or pipeline in an oxidization reaction or, in other words, cause the pipe or pipeline to rust or corrode. Left unchecked, the corrosion of the pipe or pipeline can cause a breach therein and, thus, a failure of the pipe or pipeline.

It is, therefore, desirable to provide a system that can mitigate the accumulation of water or moisture in insulation surrounding pipes or pipelines.

SUMMARY

An insulation system for insulated pipe or pipeline is provided. In some embodiments, the system can comprise a shroud or outer skin that surrounds a length of the insulation pipe or pipeline, wherein the outer skin extends at least partially along the length of the insulated pipe. The system can comprise a plurality of spaced-apart stand-off supports disposed between the insulated pipe and the outer skin to form an annulus or annular chamber around the insulated pipe.

In some embodiments, the system can comprise a gable on an upper or top side of the outer skin, the gable disposed at least partially along the length of the outer skin. The gable can comprise a plurality of ventilation openings disposed along the length of the gable. In some embodiments, the gable can comprise at least one soffit therealong, wherein the ventilation openings are disposed through the at least one soffit. In some embodiments, the system can comprise a vent screen disposed on a lower or bottom side of the outer skin, the vent screen disposed at least partially along the length of the outer skin.

In operation, as air in the annulus and gable heats up, either from being warmed from substances flowing within the insulated pipe or from external atmospheric conditions, the heated air can flow out and through the ventilation openings disposed in the gable and, as a result, cooler air can be drawn into the annulus through the lower vent screen. The resulting flow of air through the system, not unlike the flow of air through the attic of a house, can draw out moisture disposed in the insulation surrounding the pipe thus drying out the insulation. This can prevent the moisture from coming into contact with the pipe or pipeline and, thus, prevent corrosion of the pipe.

Broadly stated, in some embodiments, a ventilation system can be provided for insulated pipe, the system comprising: an outer skin circumferentially disposed around the insulated pipe, thereby forming an annular chamber between the insulated pipe and the outer skin; a plurality of stand-off supports disposed between the insulated pipe and the outer skin in the annular chamber; a gable disposed on an upper side or portion of the outer skin, the gable disposed at least partially along a length of the outer skin, and wherein the gable further comprises a plurality of openings therealong to provide communication between the annular chamber and an exterior of the system; and a vent opening disposed at least partially along a lower side or portion of the length of the outer skin.

Broadly stated, in some embodiments, the gable can comprise at least one soffit disposed therealong wherein the plurality of openings is disposed through the at least one soffit.

Broadly stated, in some embodiments, the system can further comprise a gable support disposed between the insulated pipe and the gable.

Broadly stated, in some embodiments, the gable support can be disposed on a gable support belt disposed around the insulated pipe.

Broadly stated, in some embodiments, the system can further comprise a band disposed around the system, the band configured to secure the system to the insulated pipe.

Broadly stated, in some embodiments, a method can be provided for providing ventilation around an insulated pipe, the method comprising: placing a plurality of stand-off supports circumferentially around the insulated pipe at spaced-apart locations along a length of the insulated pipe; placing an outer skin circumferentially around the insulated pipe wherein the outer skin is supported by the plurality of stand-off supports to form an annular chamber between the insulated pipe and the outer skin, wherein the outer skin further comprises: a gable disposed on an upper side or portion of the outer skin, the gable disposed at least partially along a length of the outer skin, and wherein the gable further comprises a plurality of openings therealong to provide communication between the annular chamber and an exterior of the system, and a vent opening disposed at least partially along a lower side or portion of the length of the outer skin.

Broadly stated, in some embodiments, the method can further comprise supporting the gable with a gable support disposed between the insulated pipe and the gable.

Broadly stated, in some embodiments, the method can further comprise placing the gable support on a gable support belt disposed around the insulated pipe.

Broadly stated, in some embodiments, the method can further comprise placing a band around the system to secure the system to the insulated pipe.

DETAILED DESCRIPTION OF EMBODIMENTS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments, but is not necessarily included. Thus, the present technology can include a variety of combinations and/or integrations of the embodiments described herein.

Figure 1:
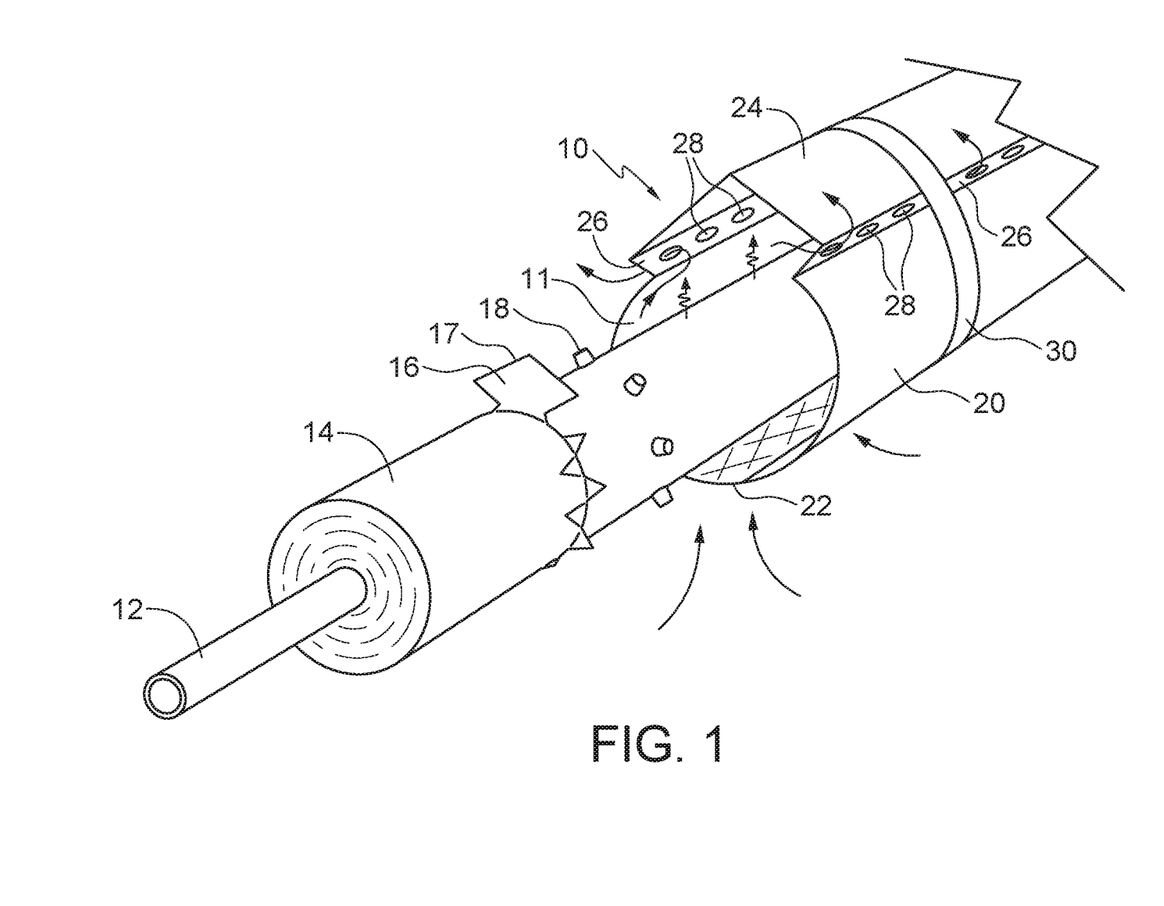
FIG. 1 is an exploded perspective view depicting one embodiment of a ventilation system for insulated pipe.

Referring to FIG. 1, ventilation system 10 is shown disposed around pipe 12, which is further surrounded by insulation 14. In some embodiments, system 10 can comprise outer skin 20 disposed around pipe 12 and insulation 14. In the illustrated embodiment, outer skin 20 comprises a cylindrical configuration for running along the length of pipe 12, although other physical configurations can be implemented as well known to those skilled in the art. In some embodiments, system 10 can comprise a plurality of stand-off supports 18, disposed in a spaced-apart configuration around the circumference of pipe 12 and insulation 14, and disposed in a spaced-apart configuration along the length of pipe 12 and insulation 14 thereby forming annulus or annular chamber 11 between insulation 14 and outer skin 20. In some embodiments, system 10 can comprise gable 24 disposed, at least partially, along the length of system 10 on an upper or top portion or side thereof. In some embodiments, gable 24 can comprise at least one soffit 26 disposed at least partially therealong, wherein soffit 26 can comprise a plurality of spaced-apart openings 28 therethrough to provide communication between annular chamber 11 and the exterior of system 10.

In some embodiments, system 10 can further comprise vent screen 22 disposed, at least partially, along the length of system 10 on a lower or bottom portion or side thereof. In some embodiments, system 10 can comprise gable support 17 configured to be disposed within, and to maintain the shape of, gable 24. In some embodiments, gable support 17 can be disposed on spacer belt disposed around insulation 14. In some embodiments, system 10 can be secured to pipe 12 and insulation 14 by band 30 disposed and tightened therearound.

Figure 2:
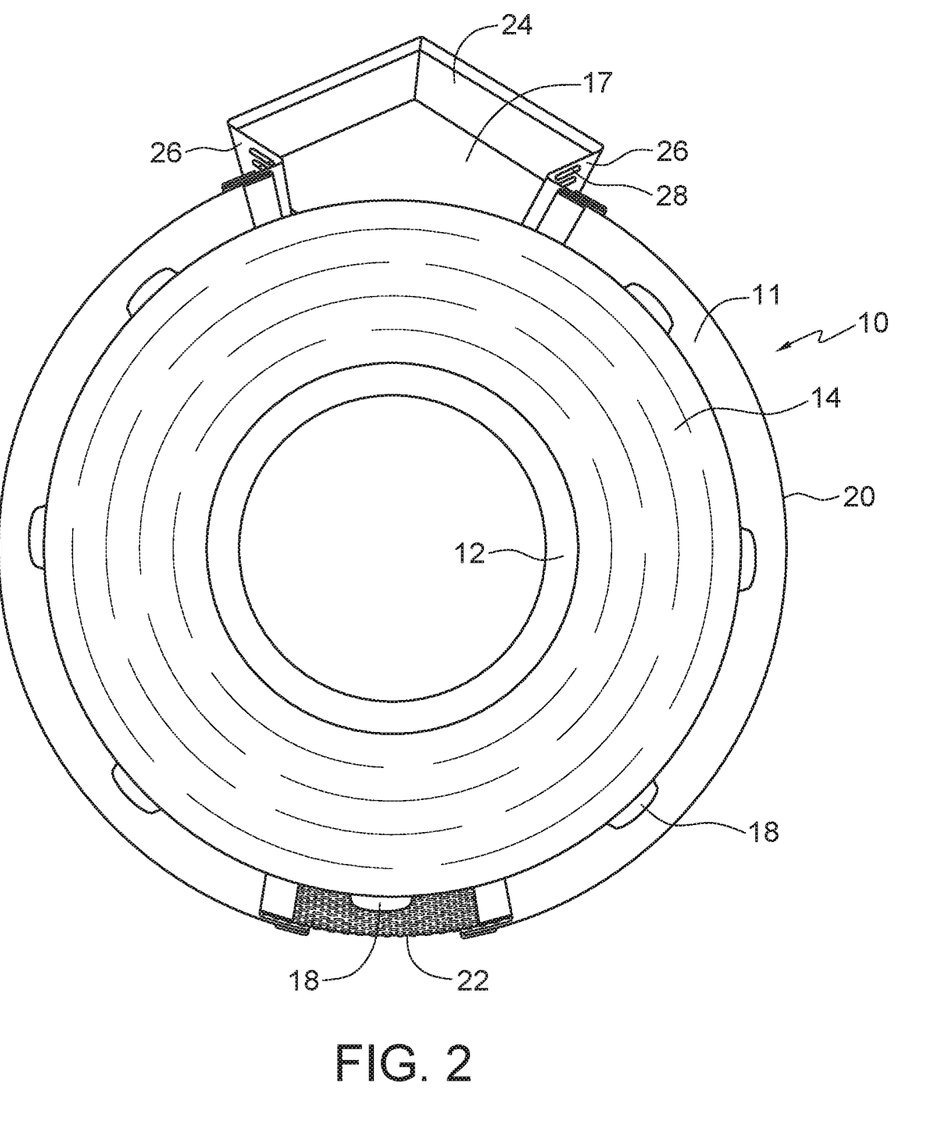
FIG. 2 is a front elevation view depicting one end of the ventilation system of FIG. 1.
Figure 3:
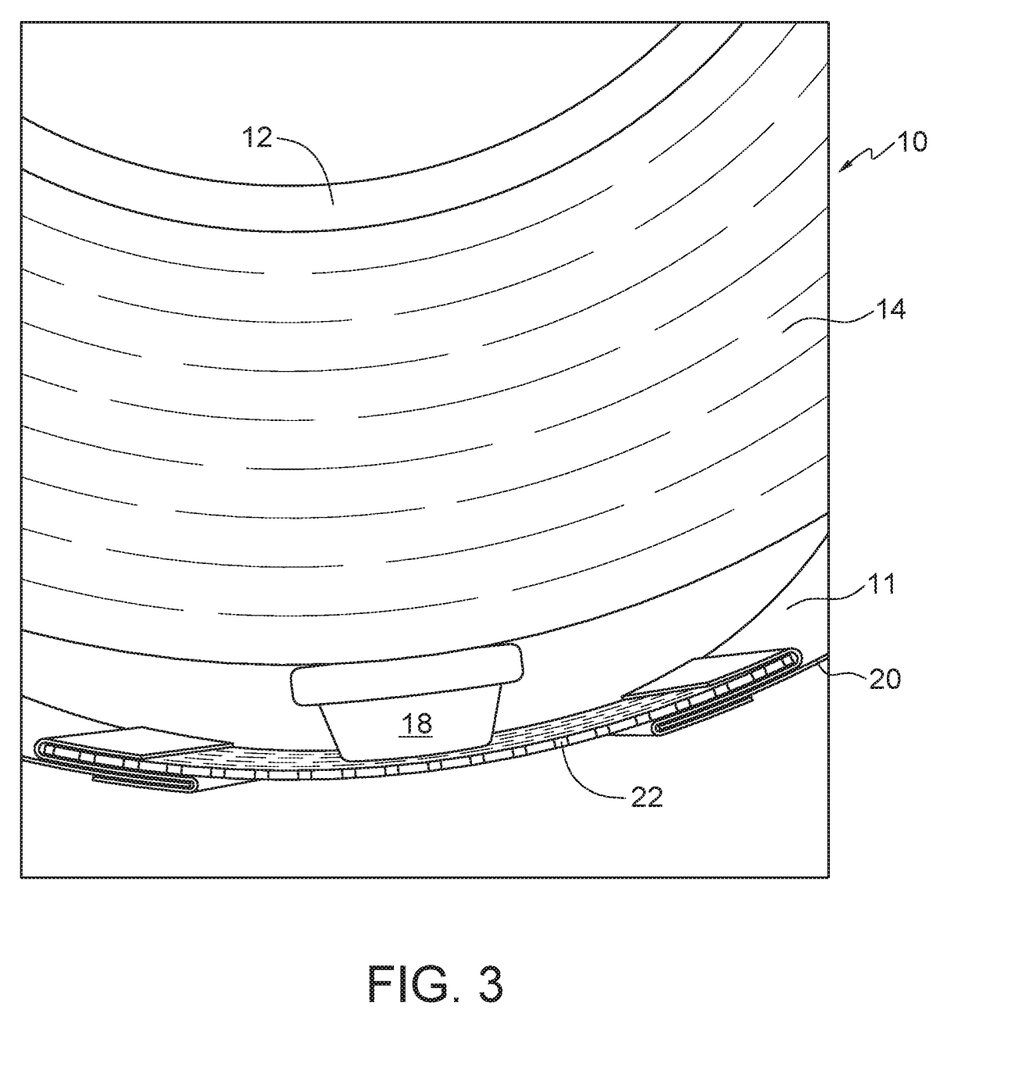
FIG. 3 is a close-up front elevation view depicting the ventilation system of FIG. 2.
Figure 4:
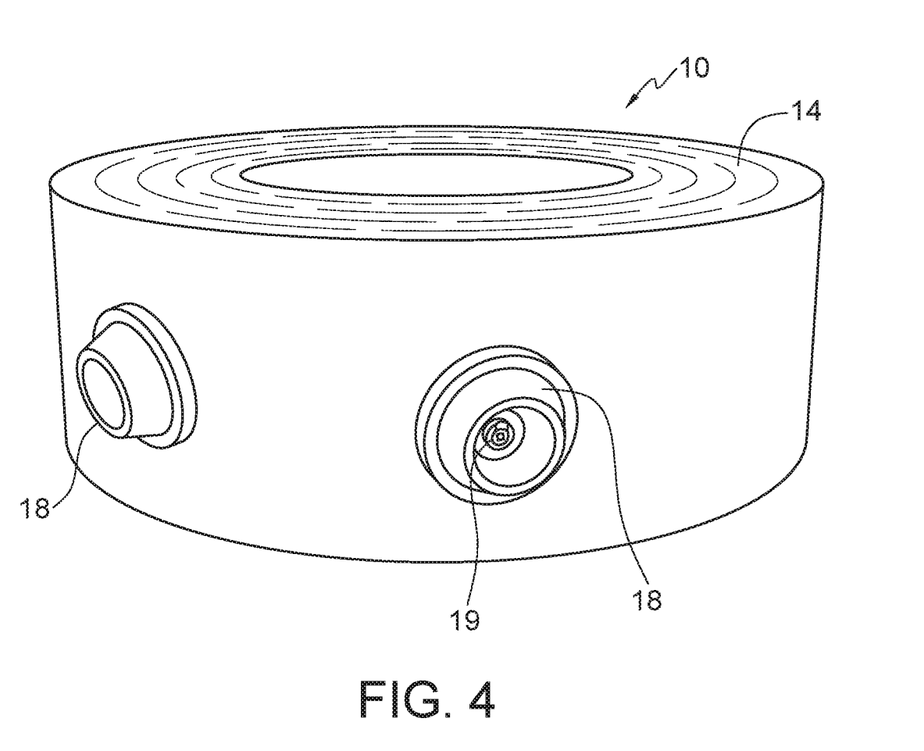
FIG. 4 is a perspective view depicting a section of the ventilation system of Figure with the outer skin removed.
Figure 5:
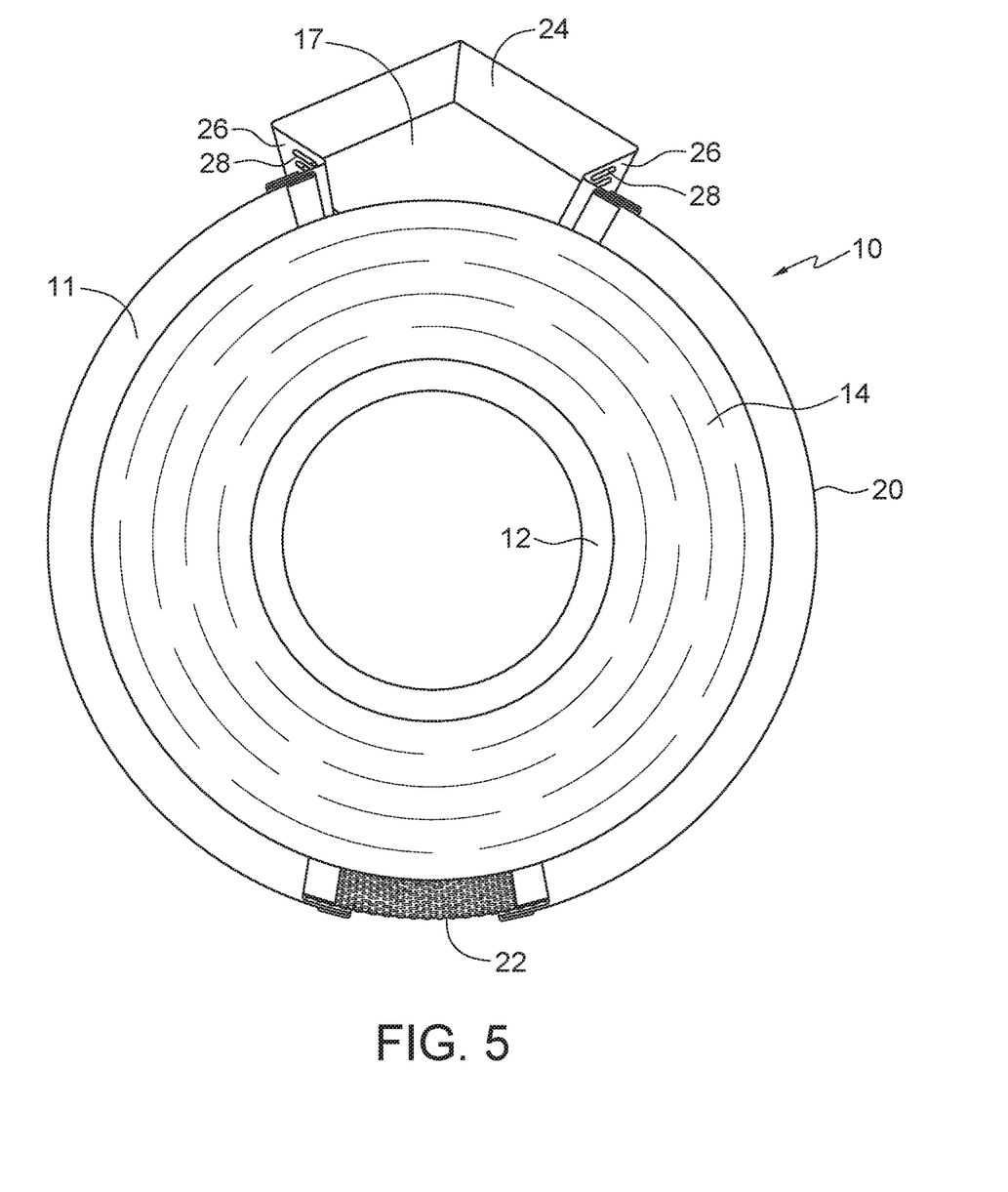
FIG. 5 is a front elevation view depicting another embodiment of the ventilation system of FIG. 1.

Referring to FIG. 2, and end view of a section of system 10 is shown to illustrate the internal configuration of one embodiment of system 10. Referring to FIG. 3, a close-up view of support 18 between insulation 14 and outer skin 20 is provided. Referring to FIG. 4, one embodiment of how supports 18 are attached to insulation 14 is shown. In the illustrated embodiment, each support 18 can be attached to insulation 14 with a fastener 19, which can include threaded fasteners as well known to those skilled in the art. Referring to FIG. 5, a section of another embodiment of system 10 is shown. In the illustrated embodiment, gable support 17 is shown configured to fit within gable 24 so as to support the shape thereof.

Figure 6:
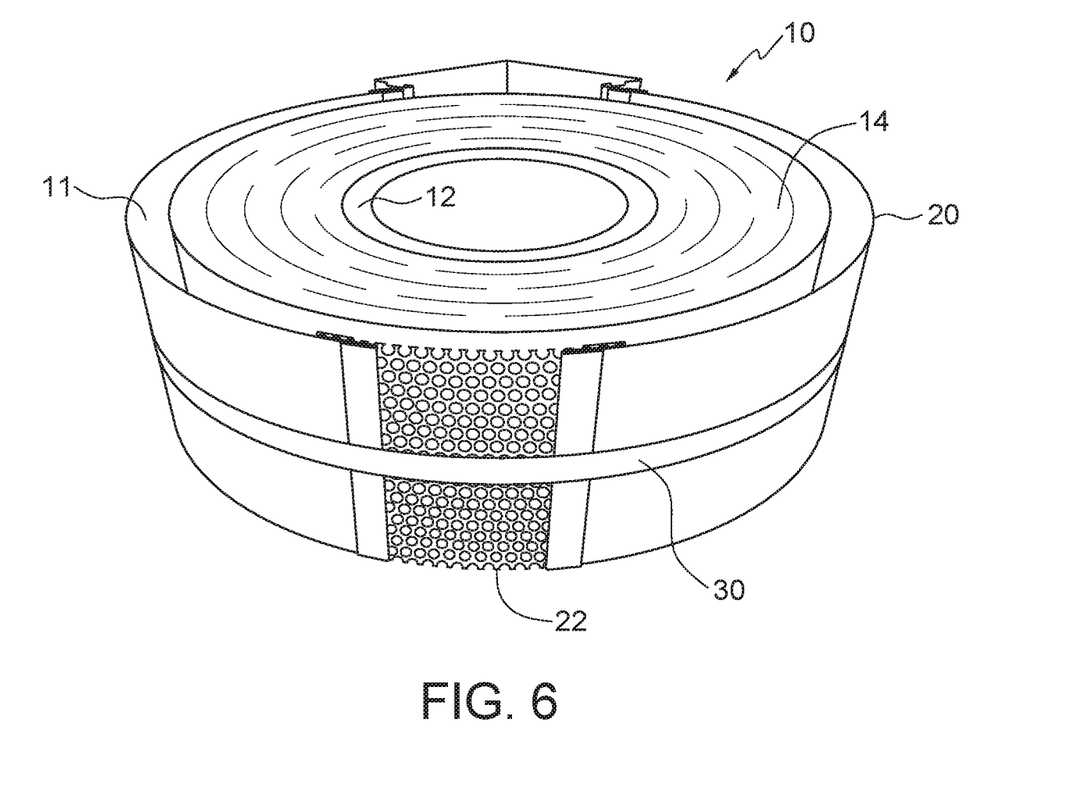
FIG. 6 is a perspective view depicting a section of the ventilation system of FIG. 5.
Figure 7:
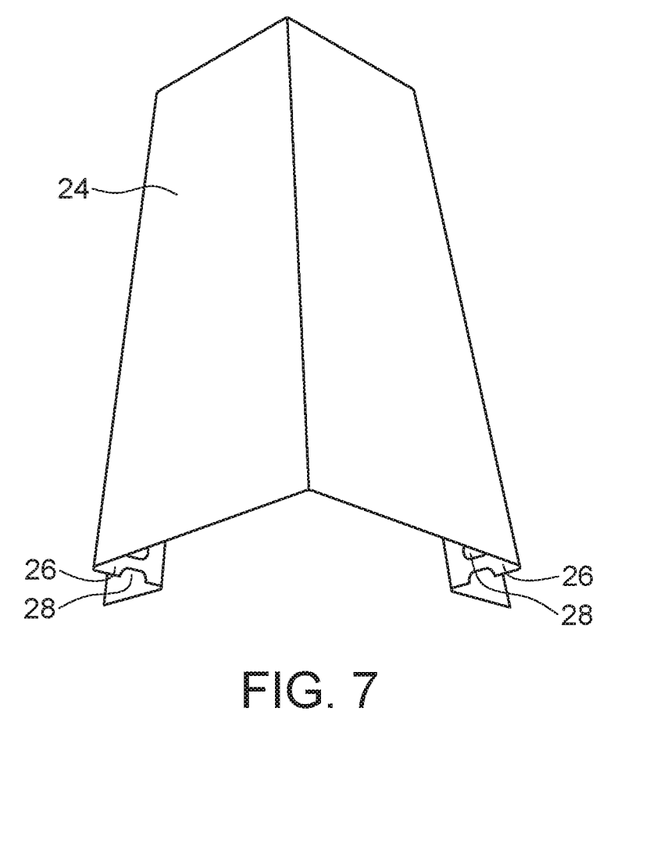
FIG. 7 is a top perspective view depicting a gable section for the ventilation system of FIG. 1.
Figure 8:
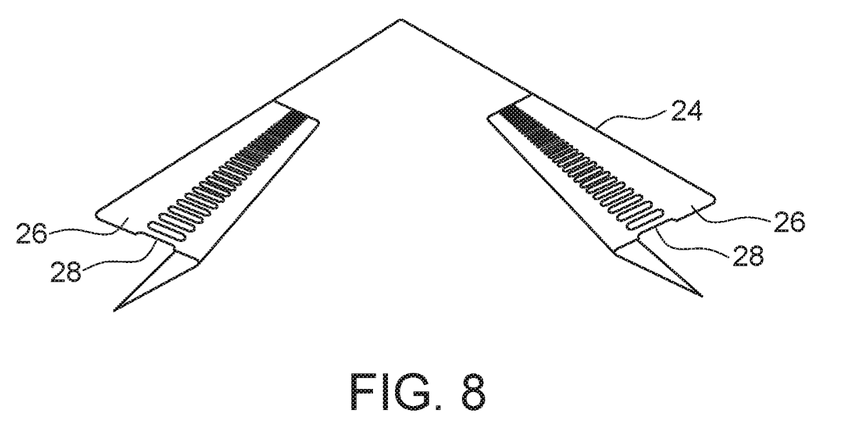
FIG. 8 is a front elevation view depicting the end of the gable section of FIG. 7.

Referring to FIG. 6, a section of one embodiment of system 10 is shown, wherein circumferential band 30 is shown disposed around outer skin 20. Band 30 can be fitted around system 10 to secure it to pipe 12 and insulation 14. A plurality of bands 30 can be placed in a spaced-apart configuration along the length of pipe 12 to secure system 10 therealong. Referring to FIGS. 7 and 8, a shortened length of gable 24 is shown prior to its assembly with outer skin 20 to form system 10.

Figure 9:
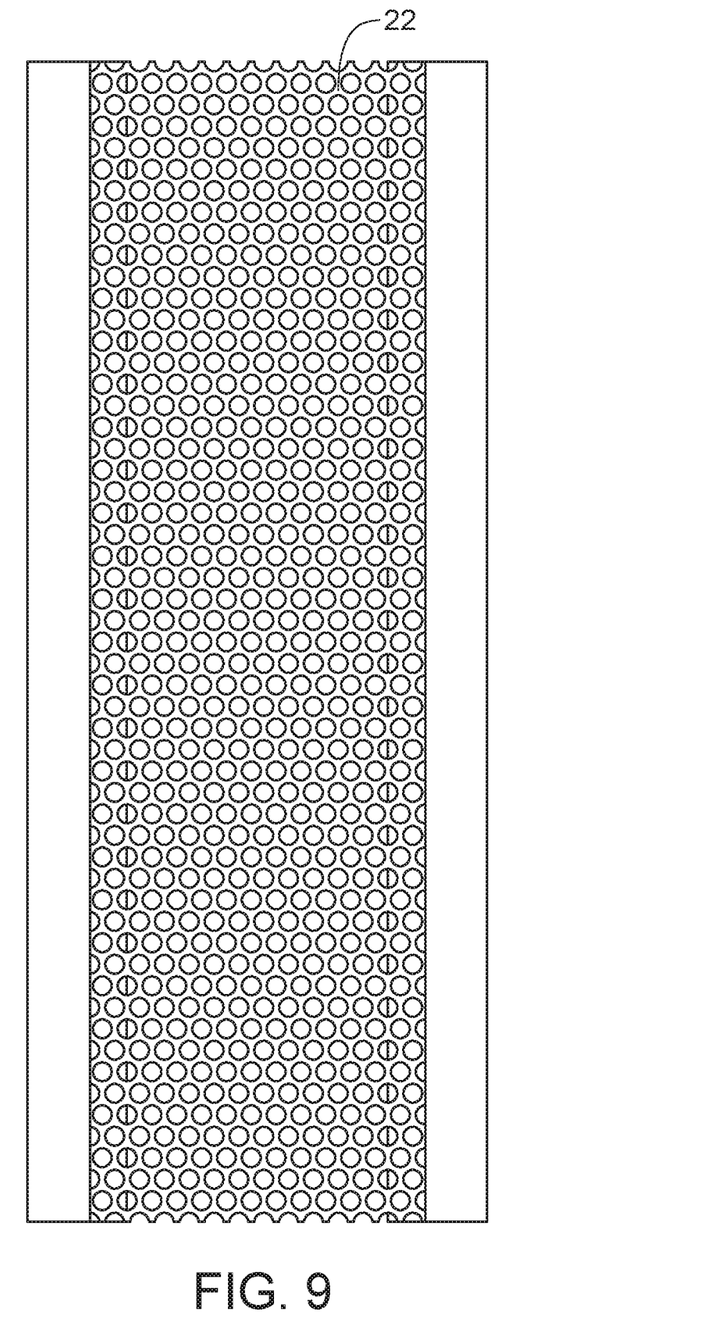
FIG. 9 is a top plan view depicting a vent screen of the ventilation system of FIG. 1.
Figure 10:
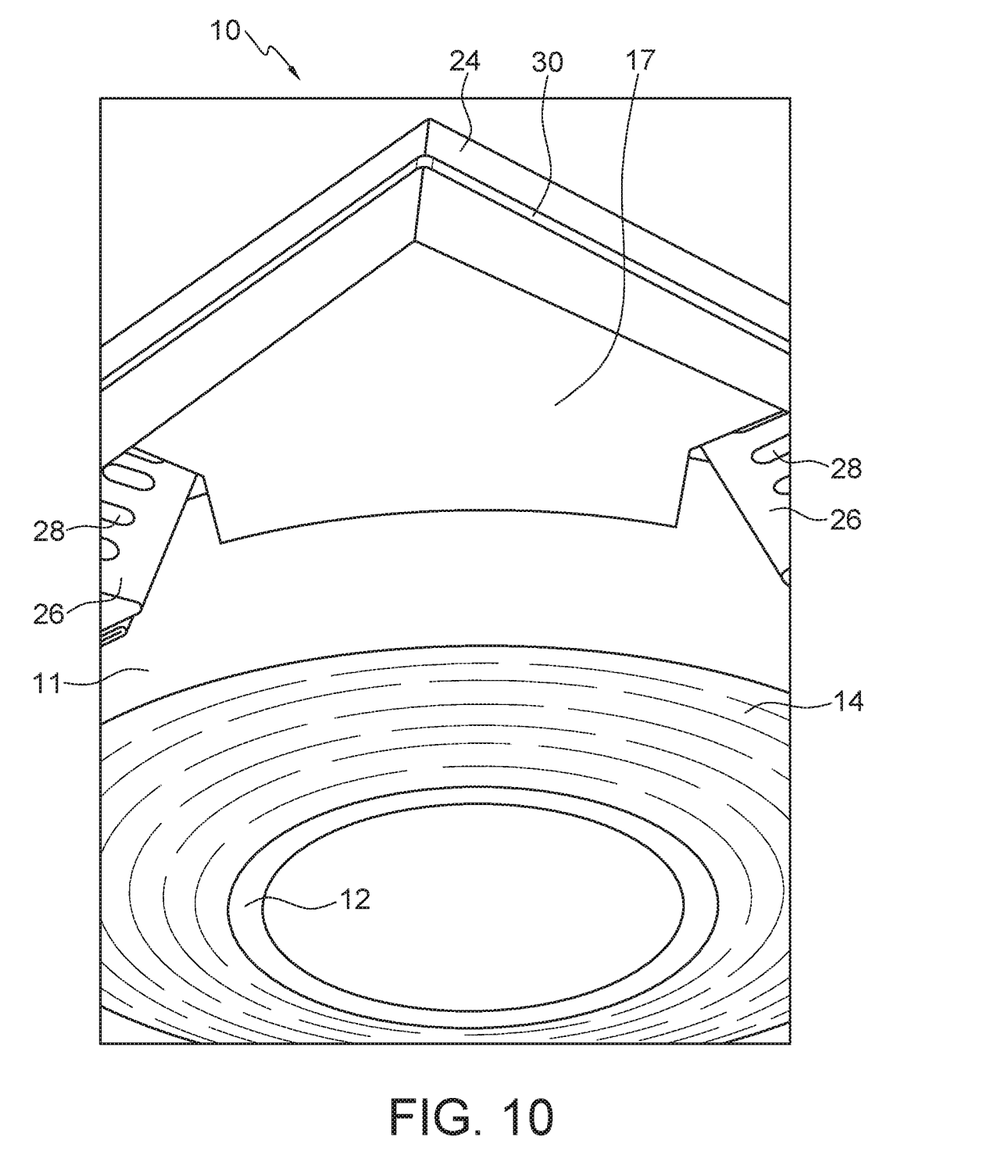
FIG. 10 is a close-up perspective view depicting an end of the ventilation system of FIG. 1.
Figure 11:
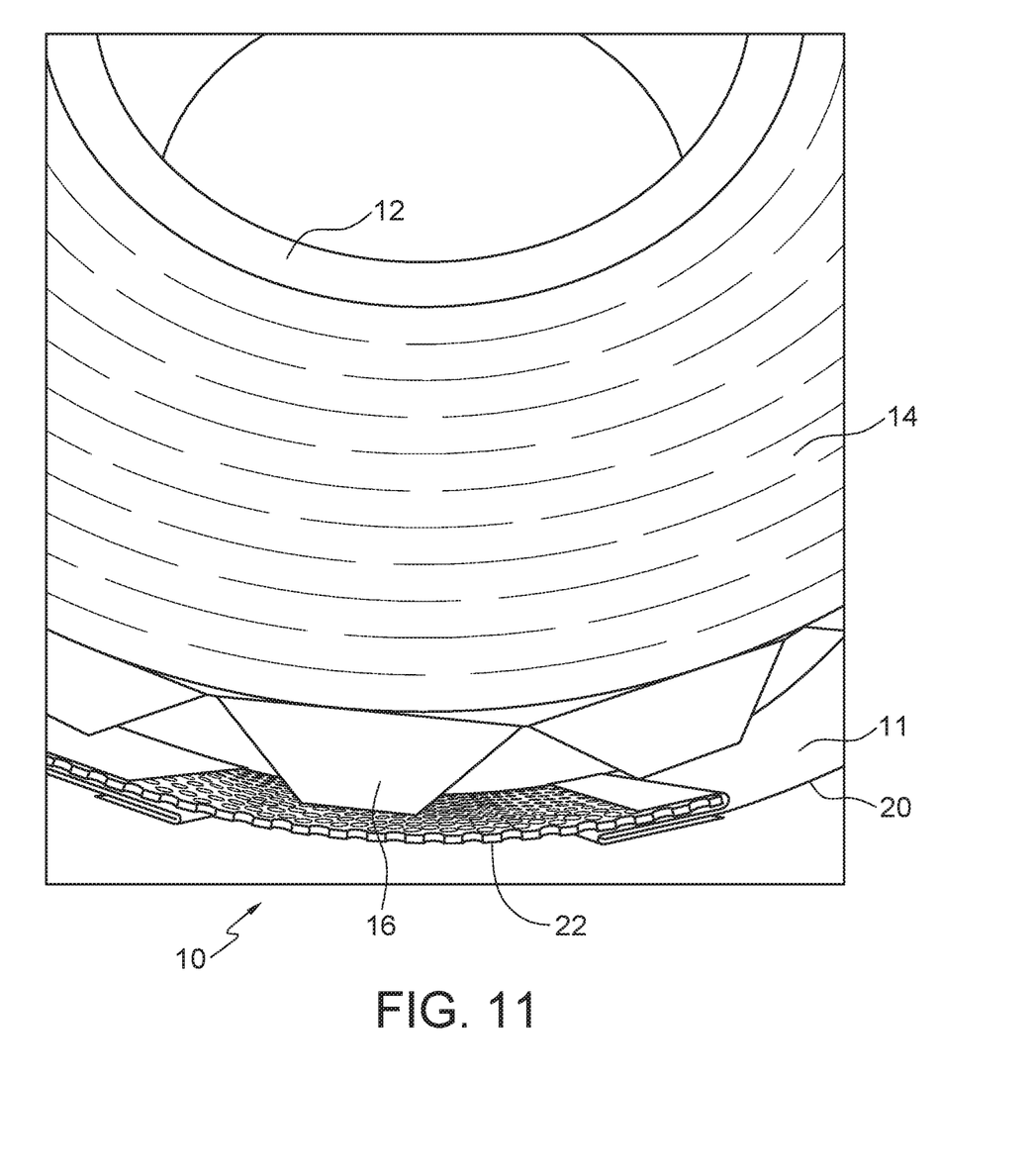
FIG. 11 is a close-up perspective view depicting an end of the ventilation system of FIG. 5.

Referring to FIG. 9, a close-up view of one embodiment of vent screen 22 is shown. Referring to FIG. 10, a close-up view of one embodiment of gable support 17 is shown to illustrate how it can support gable 24 above insulation 14. Referring to FIG. 11, a close-up end view of another embodiment of system 10 is shown comprising spacer belt 16 disposed between insulation 14 and outer skin 20 to form annular chamber 11 therebetween.

In some embodiments, system 10 can be installed on pipe 12 by first placing a plurality of spaced-apart supports 18 around the circumference of insulation 14 disposed on pipe 12, and repeating this step at spaced-apart locations along the length of pipe 12/insulation 14. Supports 18 can be attached to insulation 14 with fasteners 19. Then, outer skin 20 can be placed around the combination of pipe 12 and insulation 14 wherein outer skin 20 becomes in contact with supports 18 to form annular chamber 11 disposed between insulation 14 and outer skin 20. Outer skin 20 can then be secured to the combination of pipe 12 and insulation 14 by placing a plurality of bands 30 around outer skin 20 at spaced-apart locations along the length of pipe 12. As pipe 12 heats up from substances flowing therethrough, the heat can radiate from pipe 12 through insulation 14 into annular chamber 11 and rise up into gable 24 and exit through openings 28 disposed through soffit 26. In so doing, cooler air can be drawn in through vent screen 22 disposed along a bottom surface of outer skin 20 to provide airflow in annular chamber 11 from vent screen 22 to openings 28. This airflow can enable the removal of excess heat emanating from pipe 12 and can also remove moisture or humidity that can build up within insulation 14 due to heat radiating from pipe 12. By removing excess moisture or humidity from insulation 14, the corrosive effects of such moisture or humidity on pipe 12 can be reduced.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. A ventilation system for insulated pipe, the system comprising:
   a) an outer skin circumferentially disposed around the insulated pipe, thereby forming an annular chamber between the insulated pipe and the outer skin;

b) a plurality of stand-off supports disposed between the insulated pipe and the outer skin in the annular chamber;

c) a gable disposed on an upper side or portion of the outer skin, the gable disposed at least partially along a length of the outer skin, and wherein the gable further comprises a plurality of openings therealong to provide communication between the annular chamber and an exterior of the system; and d) a vent opening disposed at least partially along a lower side or portion of the length of the outer skin.

2. The system as set forth in claim 1, wherein the gable comprises at least one soffit disposed therealong wherein the plurality of openings is disposed through the at least one soffit.

3. The system as set forth in claim 1, further comprising a gable support disposed between the insulated pipe and the gable.

4. The system as set forth in claim 3, wherein the gable support is disposed on a gable support belt disposed around the insulated pipe.

5. The system as set forth in claim 1, further comprising a band disposed around the system, the band configured to secure the system to the insulated pipe.

6. A method for providing ventilation around an insulated pipe, the method comprising:

a) placing a plurality of stand-off supports circumferentially around the insulated pipe at spaced-apart locations along a length of the insulated pipe;

b) placing an outer skin circumferentially around the insulated pipe wherein the outer skin is supported by the plurality of stand-off supports to form an annular chamber between the insulated pipe and the outer skin, wherein the outer skin further comprises:

i) a gable disposed on an upper side or portion of the outer skin, the gable disposed at least partially along a length of the outer skin, and wherein the gable further comprises a plurality of openings therealong to provide communication between the annular chamber and an exterior of the system, and ii) a vent opening disposed at least partially along a lower side or portion of the length of the outer skin.

7. The method as set forth in claim 6, wherein the gable comprises at least one soffit disposed therealong wherein the plurality of openings is disposed through the at least one soffit.

8. The method as set forth in claim 6, further comprising supporting the gable with a gable support disposed between the insulated pipe and the gable.

9. The method as set forth in claim 8, further comprising placing the gable support on a gable support belt disposed around the insulated pipe.

10. The method as set forth in claim 6, further comprising placing a band around the system to secure the system to the insulated pipe.

* * * * *